Sept. 4, 1934.  E. N. WOOLLEY  1,972,812

CONTROL FOR SYSTEMS USING LIQUID UNDER PRESSURE

Filed Nov. 25, 1932  2 Sheets-Sheet 1

Fig. 1.

WITNESSES
Edw. Thorpe
G. L. Kitchin

INVENTOR
Edward N. Woolley
BY Munn & Co.
ATTORNEY

Sept. 4, 1934.  E. N. WOOLLEY  1,972,812
CONTROL FOR SYSTEMS USING LIQUID UNDER PRESSURE
Filed Nov. 25, 1932  2 Sheets-Sheet 2
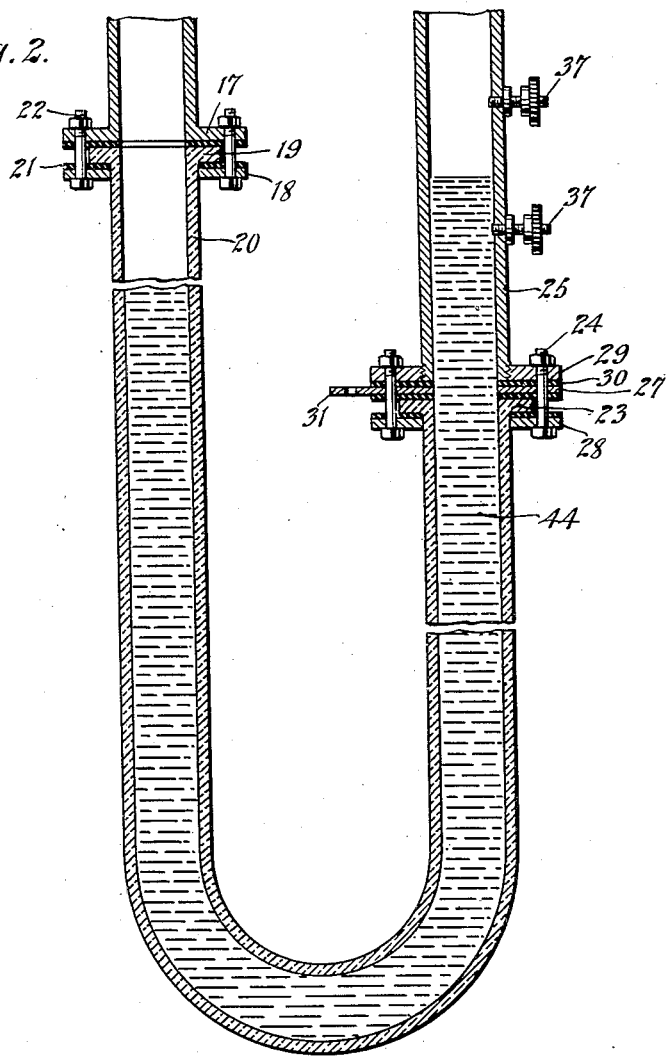
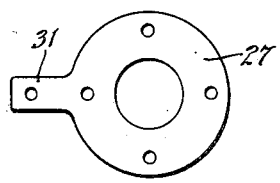
WITNESSES
INVENTOR
Edward N. Woolley
BY
ATTORNEY Patented Sept. 4, 1934

1,972,812

UNITED STATES PATENT OFFICE 1,972,812

CONTROL FOR SYSTEMS USING LIQUID UNDER PRESSURE

Edward N. Woolley, Rochelle Park, N. J.

Application November 25, 1932, Serial No. 644,409

2 Claims. (Cl. 103—11)

This invention relates to controlling devices for water systems, sewerage systems or any system using liquid under pressure, the object being to provide an automatic control which will turn on and off the pumps used in maintaining a given pressure in the system.

Another object of the invention is to provide in a control system a plurality of switches controlled automatically whereby the current is turned on and off as the pressure in the system varies.

An additional object, more specifically, is to provide in a water system a series of pumps for maintaining the pressure in the water system at a desired head, and control means for electric motors used in driving the pumps, the control means functioning to turn on and off current as the pressure increases and decreases within certain limits.

In the accompanying drawings—

Figure 1 is a diagram disclosing a control embodying my invention.

Figure 2 is an enlarged sectional view of part of the control structure illustrated at the left in Figure 1.

Figure 3 is an enlarged detailed plan view of a contact ring providing certain features of the invention.

In different systems using liquid under pressure as, for instance, a water system for towns, and particularly comparatively small towns, a number of pumps are used to maintain the pressure at a given head. At the pumping station one or more attendants are continually watching the various changes in pressure of the water mains, and when the pressure is reduced the attendant turns on more pumps to increase the head of water, and when the head or pressure of water reaches a certain point the attendant turns off one or more of the pumps. The idea is to maintain a certain prescribed pressure at all times and the attendant turns on and off the pumps to maintain the desired pressure as nearly as possible.

In the present invention an automatic control has been provided which will take the place of the various attendants and which will turn the pumps on and off automatically so as to automatically maintain the desired pressure. In the accompanying drawings one detailed arrangement has been shown, but it will be evident that variations thereof may be made without departing from the spirit of the invention. For instance, in Figure 1, 1 indicates a small reservoir which is supplied with water through pipe 2. The water passes through pipe 2 and may be pumped to cause to flow into reservoir 1 under gravity.

An automatic control for the pumps supplying pipe 2 may be used, but for the purpose of describing the invention the parts will be described in regard to the maintenance of a desired pressure in the water main 3 which supplies the entire town or any given section thereof with water. Pipes 4, 5 and 6 lead from the lower part of reservoir 1 to the water main 3, and suitable pumps 7, 8 and 9 are interposed in these pipes, said pumps being actuated by the respective electric motors 10, 11 and 12. It will, therefore, be seen that whatever current is turned on to any of the motors, the pump with which it is connected will function and will pump water from the reservoir 1 into the main 3 and from main 3 the water is distributed in the usual manner through the town or through a section of the town.

A short stand pipe 13 is connected to the main 3 in the pumping house, standpipe 13 being of any desired height, as, for instance, six or seven feet high. A water gage 14 is mounted on the upper end of pipe 13 and continually indicates the pressure in main 3. A reducing valve 15 is connected with the upper end of pipe 13 and through suitable connections is in free communication with pipe 16. Pipe 16 may be any desired kind of pipe as, for instance, a metal pipe, and is provided with a flange 17 at the lower end, as shown in Figure 2. This flange coacts with the washer 18 for gripping the flange 19 of the U-tube 20, which tube is of glass. Suitable insulating members 21 are provided adjacent flange 17 and member 18. These members are preferably of fibre though they can be of rubber or other material provided they act as a cushion between the parts whereby the various bolts 22 may be tightened without appreciable danger of breaking flange 19.

Tube 20 is of glass and is provided with a flange at each end, one flange, namely flange 19, being connected with pipe 16 as just described. The opposite flange, namely flange 23, is acted on by suitable bolts 24 and other members as shown in Figure 2, whereby the tube is clamped to a pipe 25 of insulating material. While this pipe may be of any kind of insulating materials, it has been found desirable to make the same of fibre and to provide a suitable relief valve 26 at the upper end to allow air to enter and leave. As shown in Figure 2, a contact ring 27 is clamped between the ring 28 and ring 29, a suitable insulating gasket 30 being interposed so as to cushion the parts. It will be noted that the pipe 25 is threaded so as to receive the threaded ring 29, while ring 28 is slid on to tube 20 before the flange 23 is formed. As a matter of fact, both rings 28 and 18 are slid on before flange 23 is formed, as otherwise they could not be placed in position. The ring 27 has an apertured extension 31 which is adapted to receive one end of a conductor 32, said conductor being rigidly secured to the extension 31. A conductor 33 is also connected to the extension 31 and extends to one side of the various switches 34, 35 and 36.

The fibre tube 25 is provided with a number of terminals 37 from which the conductors may lead if desired. As there are only three pumps disclosed, only four of these terminals would be needed for that purpose, namely, terminals 38, 39, 40 and 41, but for a purpose hereinafter described terminal 42 is used and also terminal 43. As shown in Fig. 2 all these terminals extend into the tube 25 so as to contact with the mercury 44 as it rises, which mercury completely fills tube 20 when the tube is not functioning and, consequently, extends from flange 19 to flange 23. When the device is functioning the water, air or other medium in pipe 16 will force the mercury downwardly in the left hand leg of tube 20 and upwardly in the right hand leg so as to contact successively with the various terminals 37.

When the system is first installed and there is no pressure in the main 3, the switches 34, 35 and 36 are closed, so that the current may go directly to the various motors 10 to 12 inclusive and thereby cause the pumps to function. The pumps are allowed to function until the desired sixty pounds pressure has been secured in main 3. As the pressure rises in the main the gage 14 will indicate this fact and, incidentally the pressure in pipe 16 will rise and force the mercury gradually upward in the right hand leg until it enters the fibre tube 25 and passes upwardly to the graduations 60 on this tube. As shown in Figure 1, there are graduations on the tube 25 from ten to seventy inclusive, said graduations indicating the pounds pressure in the main 3. It is, of course, evident that after the attendant closes switches 34, 35 and 36 he must watch gage 14 so that when it indicates sixty pounds or a trifle more, he will open all the switches 34, 35 and 36 manually. When the mercury column has reached the indication sixty it will be in contact with all of the wires 45, 46, 47, 48 and 49. Current flowing from the supply or bus wire 32 will flow directly to wire 33, and will also charge the mercury column so that all the wires 45 to 49 inclusive will be charged. After the switches 34 to 36 inclusive have been opened, current cannot flow through these switches to the motors 10, 11 and 12. However, current will pass through wire 46 and thence through the windings of the magnet 50. From the windings of magnet 50 current will pass through wire 51, wire 52 and then back to the negative supply wire 53. This will energize the magnet 50 and raise the armature 54 out of engagement with contact 55, thus opening the circuit of magnet 56. By reason of the current passing through the windings of magnet 50, the motor 10 is deprived of current and, consequently, the same will stop. While the parts just described are functioning as set forth, current will also pass through wire 47, the windings of the magnet 60, wire 61, wire 52 and back to the negative supply wire 53. Current passing in this circuit will cause the magnet 60 to raise the armature 62 out of engagement with the contact 63, whereupon current will not be supplied to the windings of magnet 64, thus permitting armature 65 and magnet 64 to drop down out of engagement with the contact 66. Contact 66 is in electrical communication with wire 53 through wire 67, while the armature 65 is connected with wire 68 extending to one side of the motor 11, the opposite side of motor 11 being connected by wire 69 to the positive bus wire 32'. It will, therefore, be noted that current passing through the windings of magnet 60 will deprive motor 11 of current. Current passing through wires 48 and 49 simultaneously will pass through the windings of magnet 70 and energize the magnet so as to raise armature 71 out of engagement with contact 72. Current passing through the windings of magnet 70 will also pass through wire 73 to wire or conductor 52, and thence to the negative bus wire 53. As contact 72 is out of engagement with armature 71 current cannot pass through wire 74 and, consequently, the magnet 75 will be deenergized and armature 76 will drop down away from contact 77. Armature 76 is connected through wire 78 to one side of motor 12, the opposite side of motor 12 being connected by wire 79 to the positive bus wire 32'. As current passes through magnet 70 it will cause motor 12 to be deprived of current and therefore stop the pump associated therewith. It will also be noted when current is passing through all of the magnets 50, 60 and 70, all of the motors are stopped, and, consequently, all of the pumps are stopped, which action will take place when the pressure in the main 3 is sufficient to cause the mercury to rise up to the graduation 60. After the pumps have stopped and water is used from the main, the pressure will gradually be reduced, and when the mercury column leaves the graduation 60 it will break contact with wire 49, but magnet 70 will not be reenergized as there is sufficient current passing through wire 48 and through resistance 80 to hold the armature 71 in its raised position. Current passing through wire 48 and resistance 80 is not sufficient to raise the armature 70 but it is sufficient to maintain the same raised after it has been raised through the action of the current in wire 49. This will prevent the motor from starting and stopping at short intervals.

However, if the pressure in the main 3 and connected pipes is further reduced, the mercury column will be lowered until it is out of engagement with the contact 42 connected to wire 48. When this occurs magnet 70 is deenergized and, consequently, armature 71 is allowed to move down under the action of gravity until it engages contact 72. When this occurs current will pass through contact 38, through wire 45, armature 71, and through this armature to contact 72, thence through wire 74, the windings of magnet 75 and wire 81 to the conductor 52 which is connected to the negative bus wire 53. Current flowing in this path will energize the magnet 75 and move armature 76 up into engagement with contact 77. When this occurs current flows from the positive bus wire 32' to wire 79, through motor 12, through wire 78, through armature 76, contact 77 and wire 82, back to the negative bus wire 53. As long as current is flowing in this circuit motor 12 will operate and the pump connected therewith will pump water from the reservoir 1 into the main 3. If this one pump is sufficient to maintain the pressure so that the mercury will remain between the graduations 55 and 60, it will continue to function and nothing else will occur.

However, if the pressure in main 3 should rise again until the mercury column engages contact 41 connected with wire 49, current will again flow through the windings of magnet 70, and armature 71 will be raised for breaking the circuit of magnet 75. This will allow armature 76 to move away from the contact 77, whereupon the circuit of motor 12 will be opened. When this occurs the motor 12 remains idle until the mercury column again moves downwardly and out of engagement with contact 42. As soon as the mercury moves out of contact 42, magnet 70 will be deenergized and the circuit through armature 71 will be established, and also the circuit through armature 76, whereupon the motor 12 will again begin to function. If the pressure fluctuates between the points just described, that is between graduations 55 and 60, the pump 9 will function alone, but if there should be a greater demand for water and the pressure should be reduced further, until it is below contact 40 connected with wire 47, then magnet 60 would be deprived of current and the circuit through armature 62 would be established. Current passing in this circuit would cause armature 65 to close its circuit and immediately motor 11 would begin to function. If the pressure should be further decreased and the mercury column should move downwardly past the graduation 50, armature 50 would be deprived of current and the circuits associated therewith would be closed so that motor 10 would begin to function.

The three motors, each operating a pump, give the maximum service, and unless the three motors maintain a pressure sufficient for the needs, nothing could be done as the maximum results are being secured in the pumping system. If there should be a greater supply of water demanded than the pumps supply, pressure merely would decrease in the main 3 and pipes connected therewith. When the large demand for water ceases the pressure in the main 3 would immediately build up and as the mercury column passes upwardly the circuit in magnets 50, 60 and 70 would be successively closed and consequently the motors 10, 11 and 12 would be successively deprived of current. It is to be understood that all parts just described will function automatically after the system has once been started, and the hand operated switches 34, 35 and 36 have been opened.

It will be understood that the system is designed to meet specific working conditions, and, consequently, contact 38 is so placed as to function during all emergency fluctuations in line up to 50% above the peak load of the system. However, if all the pumps were running and the pressure drops below this point, it would evidently indicate an abnormal condition in the system, such as a broken main. Therefore, the stopping of the pumps will be desirable and this will naturally take place. The pumps may be started as heretofore set forth and, if desired, the hand switches could be closed and water pumped into the system, even though it was being wasted by being discharged through a broken main.

The arrangement of magnets 50, 60 and 70 together with their associated parts, and the arrangement of magnets 56, 64 and 75 present a desired structure, in that current of a given voltage may be used, as, for instance, 110 volts, or current having two voltages may be used. Where two voltages are being used, one will be supplied by the wires 86 and 87 and will act on magnets 50, 60 and 70, while the higher voltage, for instance, 400 or 500 volts, will be connected to the motor circuits, which circuits are opened and closed by the respective secondary switches 58, 65 and 76.

If for any cause the pressure should become too high or pass upwardly to contact 43 current will pass through alarm device 83, which may be a bell. The current passing through the alarm device will pass from the supply bus wire 32 through the mercury, through contacts 43 to wire 84, alarm device 83 and wire 85, back to the negative bus wire 53. The current used in the entire system is fed from the main bus wires 86 and 87 from any suitable supply. The faster hand switch 88 is used to connect the bus wires 86 and 87 to the control system. In addition wires 89 and 90 are connected to the windings of magnet 91 which holds the armature 92 away from contact 93. If the main supply wires 86 and 87 should be deprived of current from some cause outside the control system, magnet 81 will be deenergized and spring 94 will quickly move the armature 92 into engagement with contact 93, whereupon the circuit of the alarm device 95 will be closed. This circuit includes a battery or dry cell 96, wire 97, wire 98, wire 99 and armature 92 and contact 93. It will thus be seen that alarm device 83 will function when the automatic system for some unknown reason fails to shut off the pumps and when the current from the main supply is shut off the alarm device 95 will function.

If for any reason the hand switch 88 is to be opened for some considerable time, a piece of paper or other insulating member is slipped in between contact 93 and armature 92 so as to temporarily make inoperative the alarm device 95.

By using the control device of the character described no attention need be paid to the pumps, motors or other devices except the usual oiling, cleaning and repairs. Only one attendant in a pumping station will be necessary and his work will be more in the nature of a watchman listening for one of the alarm devices to function, as the parts under ordinary conditions will function day and night continuously and in an automatic manner for maintaining the pressure in the main 3 at the point determined by the engineers installing the system.

If for any reason the automatic system should get out of order as, for instance, by a broken wire or other cause, the attendant may close one or all of the switches 34, 35 and 36 to maintain the desired pressure in the main while suitable repairs are made. After the repairs have been properly made the manually actuated switches are usually left closed until the pressure has caused the mercury column to reach the graduation 60, though, if desired, they can be opened after the mercury column has reached contact 39 connected with wire 46.

Switch plugs 100, 101 and 102 are arranged in the feed wires of the magnets 50, 60 and 70, and as shown in the drawings make a direct connection, so that the respective wires 46, 47 and 49 are continuous from the mercury column to the respective coils. However, these plugs are adapted to be rearranged and crossed so that the motors which operate the pumps may be shifted in their turn for operation. For instance, motor 12 will be operated first, as shown in the drawings, but in order that motor 11 or motor 10 may operate first or second, the switch plugs 100, 101 and 102 may be crossed in various ways to secure the desired result so that for one week motor 12 may be No. 1 motor, the next week motor 11 may be No. 1 motor, and so on.

I claim:—

1. The combination with a liquid distributing system having a plurality of pumps for maintaining the liquid under pressure and an electric motor for operating each pump independently, of a control system including a tubular member connected with said liquid distributing system, a column of mercury in said tubular member adapted to be raised as the pressure in said system increases, a plurality of contacts carried by said tubular member longitudinally spaced thereon and extending to a point interior thereof so as to be engaged by said mercury as it rises, a conductor connected to each of said contacts, a circuit for the lowermost of said conductors including the mercury in said tubular member, a plurality of primary switches arranged in multiple, there being the same number of primary switches as electric motors, and a primary electro-magnet in the circuit of each primary switch, a secondary electro-magnet for each of said primary switches, said secondary electro-magnets when functioning opening said primary switches, a conductor extending from each secondary magnet to one of said contacts on said tubular member other than the lowermost contact whereby as said column of mercury rises the circuits of said secondary electro-magnets will be successively closed for causing said primary switches to successively open a circuit for each of said primary magnets, a circuit for each electric motor, and a secondary switch interposed in each of the last mentioned circuits, said secondary switches being positioned to be closed by said primary electro-magnets when the latter are energized.

2. The combination with a liquid distributing system having a plurality of independent pumps for maintaining the liquid under pressure in said system, and an electric motor for operating independently each of said pumps, of an automatic control system for turning on and off said motors, said control system including a mercury column, means actuated by the pressure in said distributing system for causing said mercury column to rise and fall as the pressure in said system rises and falls, an independent secondary switch in the circuit of each of said motors, a primary electro-magnet for closing each of said secondary switches, a secondary electrically actuated means for each primary electro-magnet for opening the circuit thereof, a plurality of contacts extending into the path of said mercury column and longitudinally spaced in respect thereto, said contacts being connected respectively to the respective secondary electrically actuated means whereby when said column moves upwardly said secondary electrically actuated means are caused to function successively and successively open the circuits of said primary electro-magnets for causing the release successively of said secondary switches.

EDWARD N. WOOLLEY.